United States Patent Office.

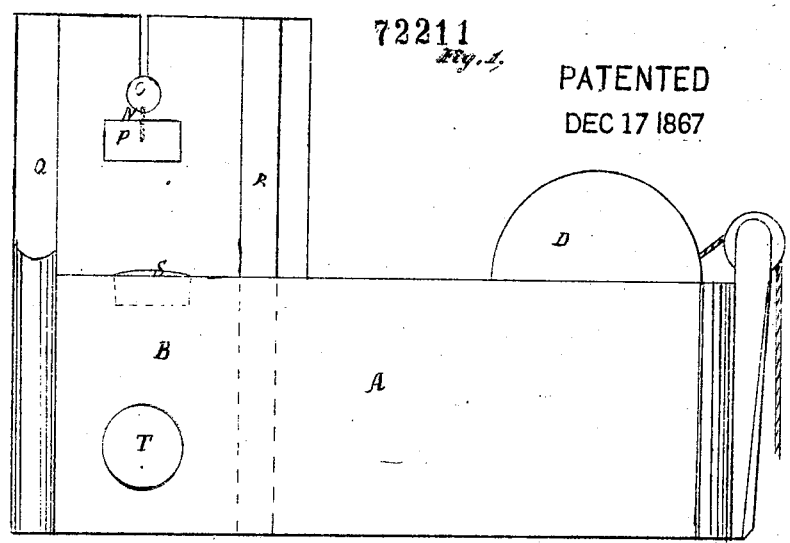
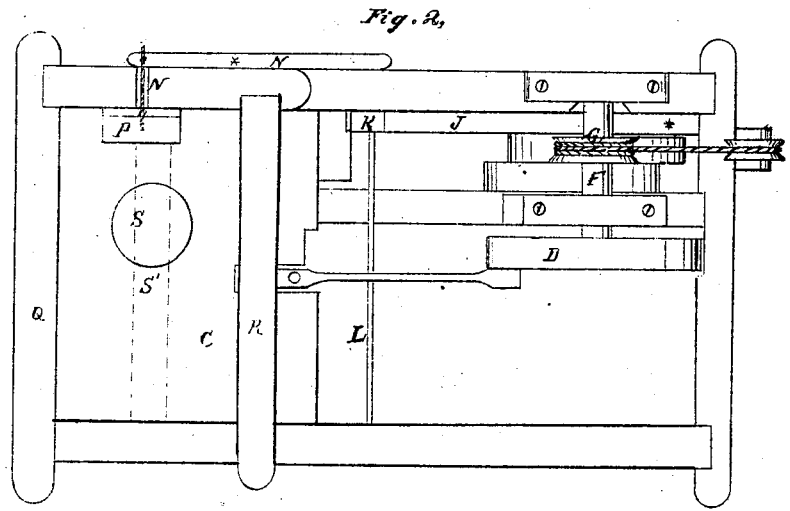
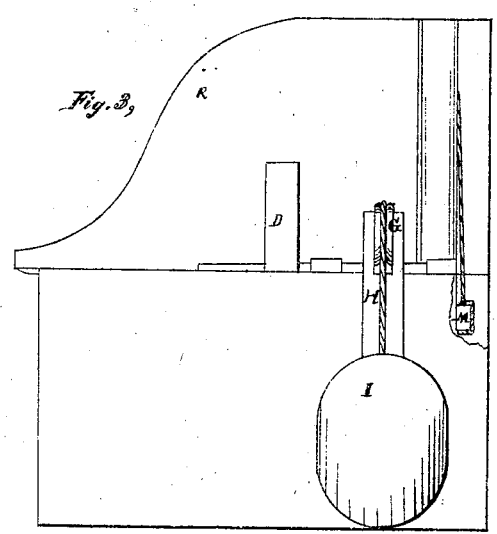

C. C. LYMAN, OF EDINBORO, PENNSYLVANIA.

Letters Patent No. 72,211, dated December 17, 1867.

IMPROVED ANIMAL-TRAP.

*The Schedule referred to in these Letters Patent and making part of the same.*

TO ALL WHOM IT MAY CONCERN:

Be it known that I, C. C. LYMAN, of Edinboro, in the county of Erie, and State of Pennsylvania, have invented certain new and useful Improvements in Animal-Traps; and I do hereby declare that the following is a full and complete description of the same, reference being had to the accompanying drawings, making a part of this specification, in which—

Figure 1 is a side view of the trap.

Figure 2 is a top view.

Figure 3 is an end view.

Like letters of reference refer to like parts in the views.

In fig. 1, A represents an oblong square box, one end of which is partitioned off into a compartment or section, B, fig. 1, the top of which, when the trap is set, covered with a slide, C. This slide is connected to a wheel, D, by a link, E, said wheel being keyed to the end of the shaft F. On this shaft is also a grooved pulley, G, around which is wound a cord, H, to which is attached a weight, I, fig. 3. J is a spring-bar or check fixed at the point $x$ to the side of the box, and which is so arranged that the free end K will be in line with and touch the edge of the slide C, as shown in fig. 2. L is a rod by which the spring-check is held in line and contact with the slide, and also connects with the end of the lever M, said lever being pivoted to the side of the box at the point $x$, fig. 2. To the other end of this lever is attached a cord, N, roven in the hole O. To this cord is secured the bait P, hung upon the inside of the upper section of the trap, as shown in fig. 1.

Having thus described the construction and arrangement of the trap, the practical operation of the same is as follows: The trap, being properly baited, the cord is then wound upon the pulley G. The animal enters the upper section of the trap between the sides Q R, passing over the slide C to the bait P. Now, as the animal works or pulls the bait, the result will be to draw up the end of the lever M, which will cause a corresponding depression of the opposite end to which the spring-bar or check J is attached. By this the end of the check will also be depressed below the slide, which will immediately be drawn from under the animal by the winding of the cord by the weight I, and precipitate it into the box below. The slide will again be thrown back by the link and wheel, and when back beyond the end of the bar or check, the said bar will spring up again in line with the edge of the slide, and thus prevent it from being drawn out by the weight until the check is again depressed by the animal pulling at the bait, in the manner as before described.

The trap may also be sprung by the following device: Near the centre of the slide is a round hole, in which is loosely fitted a block, S, fig. 1, supported by a strip indicated by the dotted lines S', reaching across the under side of the slide. One end of this strip is secured to the slide, whereas the other end is made to rest upon the spring-bar or check, on an arm proceeding from the spring along under the slide, and upon which the strip rests, as above said. Now, as the animal passes over the slide and steps upon the block S, its weight will cause the block to descend, and in so doing depress the free end of the strip S', which, by resting upon the arm of the spring-check, will depress it below the edge of the slide, and allow it to be suddenly drawn from under the animal by the weight, as in the former instance, and in the same way precipitate the animal into the lower section of the box, from which it can be taken through the door T.

Instead of the pulley, cord, and weight for springing the slide, a coil-spring may be used. Such a spring is shown at A', fig. 2.

What I claim as my improvement, and desire to secure by Letters Patent, is—

1. The arrangement of the lever M, spring-check J, in combination with the slide C and box A, for the purpose and in the manner substantially as set forth.

2. The lever M, spring-check J, as arranged in combination with the slide C, and operated in the manner as and for the purpose described.

3. The arrangement of the block S, strip S', in combination with the spring-check J, in the manner as and for the purpose set forth.

C. C. LYMAN.

Witnesses:
W. H. BURRIDGE,
J. HOLMES.